US006548768B1

(12) United States Patent
Pettersson et al.

(10) Patent No.: US 6,548,768 B1
(45) Date of Patent: Apr. 15, 2003

(54) DETERMINATION OF A POSITION CODE

(75) Inventors: Mats Petter Pettersson, Lund (SE); Tomas Edso, Lund (SE)

(73) Assignee: Anoto AB, Lund (SE)

( * ) Notice: Subject to any disclaimer, the term of this patent is extended or adjusted under 35 U.S.C. 154(b) by 324 days.

(21) Appl. No.: 09/676,892

(22) Filed: Oct. 2, 2000

Related U.S. Application Data

(60) Provisional application No. 60/157,967, filed on Oct. 6, 1999.

(30) Foreign Application Priority Data

Oct. 1, 1999 (SE) ................................................ 9903541

(51) Int. Cl.$^7$ .............................................. G06K 11/06
(52) U.S. Cl. ..................................................... 178/18.01
(58) Field of Search ................................. 345/179, 467; 178/18.01, 18.03, 18.09, 19.01, 1

(56) References Cited

U.S. PATENT DOCUMENTS

| | | | | |
|---|---|---|---|---|
| 4,924,505 A | | 5/1990 | Leberl et al. ................ | 382/287 |
| 5,477,012 A | | 12/1995 | Sekendur .................. | 178/18.09 |
| 5,652,412 A | | 7/1997 | Lazzouni et al. ......... | 178/18.01 |
| 5,661,506 A | | 8/1997 | Lazzouni et al. ............ | 345/179 |
| 5,717,168 A | * | 2/1998 | DeBuisser et al. ........ | 178/18.04 |
| 5,852,434 A | | 12/1998 | Sekendur .................. | 178/18.01 |
| 6,249,273 B1 | * | 6/2001 | Plog ............................ | 345/467 |

FOREIGN PATENT DOCUMENTS

| EP | 0171284 A2 | 2/1986 |
|---|---|---|
| EP | 0206246 A2 | 12/1986 |

OTHER PUBLICATIONS

Christer Fåhraeus, Jan Nilsson, and Patrik Söderlund, U.S. patent application No. 09/301,856, filed Apr. 29, 1999.

Mats Petter Pettersson and Tomas Edsö, U.S. patent application No. 60/157,967, filed Oct. 6, 1999.

* cited by examiner

*Primary Examiner*—Richard Hjerpe
*Assistant Examiner*—Francis Nguyen
(74) *Attorney, Agent, or Firm*—Birch, Stewart, Kolasch & Birch, LLP

(57) ABSTRACT

A method and a device for determining a virtual raster of a code pattern consisting of a plurality of marks with associated coordinates $m_n$. Each mark is located at a nominal position but displaced from the nominal position in one of a plurality of directions, depending upon the value of the mark. The nominal positions form raster points $g_n$ of the virtual raster, and the raster points are situated on raster lines, which intersect at a first angle. In addition there is a device for determining an initial vector $V_{1,2}$ on the basis of the coordinates $m_1$, $m_2$ of one or more marks, which initial vector extends approximately between a first and a second adjacent raster point $g_1$, $g_2$. A calculation device determines a second vector $V_{2,3}$, which forms said angle with the first vector and is the same length as the first vector and extends from the second raster point $g_2$ approximately to a third raster point $g_3$. The mark coordinate $m_3$ which is associated with the third raster point $g_3$ is determined. Subsequently the actual coordinates are calculated for the third raster point on the basis of the third mark's coordinates and its value. The actual coordinates for the third raster point are stored, after which the procedure is repeated taking the second vector as the starting point.

15 Claims, 6 Drawing Sheets

DETERMINATION OF A POSITION CODE

CROSS REFERENCE TO RELATED APPLICATION

This application claims the benefit of U.S. Provisional Application No. 60/157, 967, Oct. 6, 1999.

FIELD OF THE INVENTION

This invention concerns a method for determining a position code arranged on a surface. More particularly the invention concerns a method and a device for determining a virtual raster of a position code.

BACKGROUND OF THE INVENTION

In many situations it is desirable to be able to determine an absolute position on a surface. One example concerns the digitization of drawings. Another example is when an electronic version of handwritten information is required.

Examples of prior-art devices for position determination are found, for example, in U.S. Pat. No. 5,852,434 which describes a device for determining an absolute position. The device comprises a writing surface which is provided with a position-coding pattern by means of which X-Y-coordinates can be determined, a detector which can detect the position-coding pattern and a processor which, on the basis of the detected position-coding pattern, can determine the position of the detector relative to the writing surface. The device makes it possible for a user to enter handwritten and hand-drawn information into a computer at the same time as the information is being written/drawn on the writing surface.

Three examples of position coding are given in U.S. Pat. No. 5,852,434. The first example is symbols, each of which is constructed of three concentric circles. The outer circle represents the X-coordinate and the middle circle the Y-coordinate. Both the outer circles are additionally divided into 16 parts which, depending upon whether they are filled in or not, indicate different numbers. This means that each pair of coordinates X, Y is coded by a complex symbol with a particular appearance.

In the second example, the coordinates of each point on the writing surface are given by means of bar-codes, a bar-code for the X-coordinate being shown above a bar-code for the Y-coordinate.

A checkered pattern which can be used to code the X- and Y-coordinates is given as a third example. However, there is no explanation as to how the checkered pattern is constructed or how it can be converted into coordinates.

A problem with the known pattern is that it is constructed of complex symbols and the smaller these symbols are made, the more difficult it is to produce the patterned writing surface and the greater the risk of incorrect position determinations, while the larger the symbols are made, the poorer the position resolution becomes.

A further problem is that the processing of the detected position-coding pattern becomes rather complicated, due to the fact that a processor has to interpret complex symbols.

An additional problem is that the detector must be constructed in such a way that it can record four symbols at the same time so that it is certain to cover at least one symbol in its entirety, which is necessary in order for the position determination to be able to be carried out. The ratio between the required sensor surface and the surface of the position-coding pattern which defines a position is thus large.

In Swedish Patent Application No. 9903541-2, which has been assigned to the Applicant, a position code is described which can advantageously be used according to the invention. The position code consists of a raster and marks which are situated at each raster point. The marks are preferably essentially circular and are displaced relative to the raster points in one of four orthogonal directions. The raster is virtual and is thus invisible both to the eye and to sensors.

In order to decode the above-mentioned position code the virtual raster must be recreated. The recreation of the raster is the subject matter of this invention.

SUMMARY OF THE INVENTION

The object of this invention is to provide a method and a device for determining of a virtual raster of a position code of the above-mentioned type.

More particularly, the code pattern consists of a plurality of marks with associated coordinates, each mark being located at a nominal position but displaced from the nominal position in one of a plurality of directions, depending upon the value of the mark. The nominal positions form raster points of the virtual raster, and the raster points are situated on raster lines which intersect at a first angle.

According to the invention, first an initial vector $V_{1,2}$ is determined on the basis of the coordinates $m_1$, $m_2$, of one or more marks, which initial vector extends approximately between a first and a second adjacent raster point $g_1$, $g_2$. Subsequently a second vector is determined, which forms said angle with the first vector and is the same length as the first vector and extends from the second raster point approximately to a third raster point. The mark which is associated with the third raster point is determined, after which the actual coordinates for the third raster point are calculated on the basis of the coordinates of the third mark and its value. The actual coordinates are stored and used later as the starting point for calculating the next vector.

In this way the raster points are determined one by one, progressing across the surface with the marks in steps. By means of this process being carried out in steps, each vector is corrected immediately by comparison with the associated coordinates. Any error in the image caused by perspective or other distortions can be tolerated without the decoding being adversely affected.

According to the invention, the initial vector is preferably determined as the vector which connects the two marks which are the least distance apart of a set of marks, the vector being extended on each side by a distance corresponding to the displacement of the marks from the associated raster point. The code pattern is so constructed that two adjacent marks which are situated close to each other must be on the raster line and displaced towards each other. This is utilized advantageously for determining the initial vector. Subsequently all calculations are carried out using the coordinates of the marks.

The method according to the invention is best utilized in association with an essentially orthogonal square raster grid. In addition each mark is preferably displaced along a raster line, by a distance corresponding to between ⅛ and ¼, preferably ⅙, of the distance between two raster points. In this way the raster points can easily be determined based on the coordinates of the marks.

The coordinates of the marks are suitably determined as the center of gravity of the whole mark. The marks are usually obtained as an image on a sensor which has a plurality of pixels, each mark taking up more than one pixel on the sensor surface.

BRIEF DESCRIPTION OF THE DRAWINGS

In the following the invention will be described in greater detail by way of an embodiment and with reference to the accompanying drawings, in which.

DESCRIPTION OF THE PREFERRED EMBODIMENT

The Position Code

Figure 1:
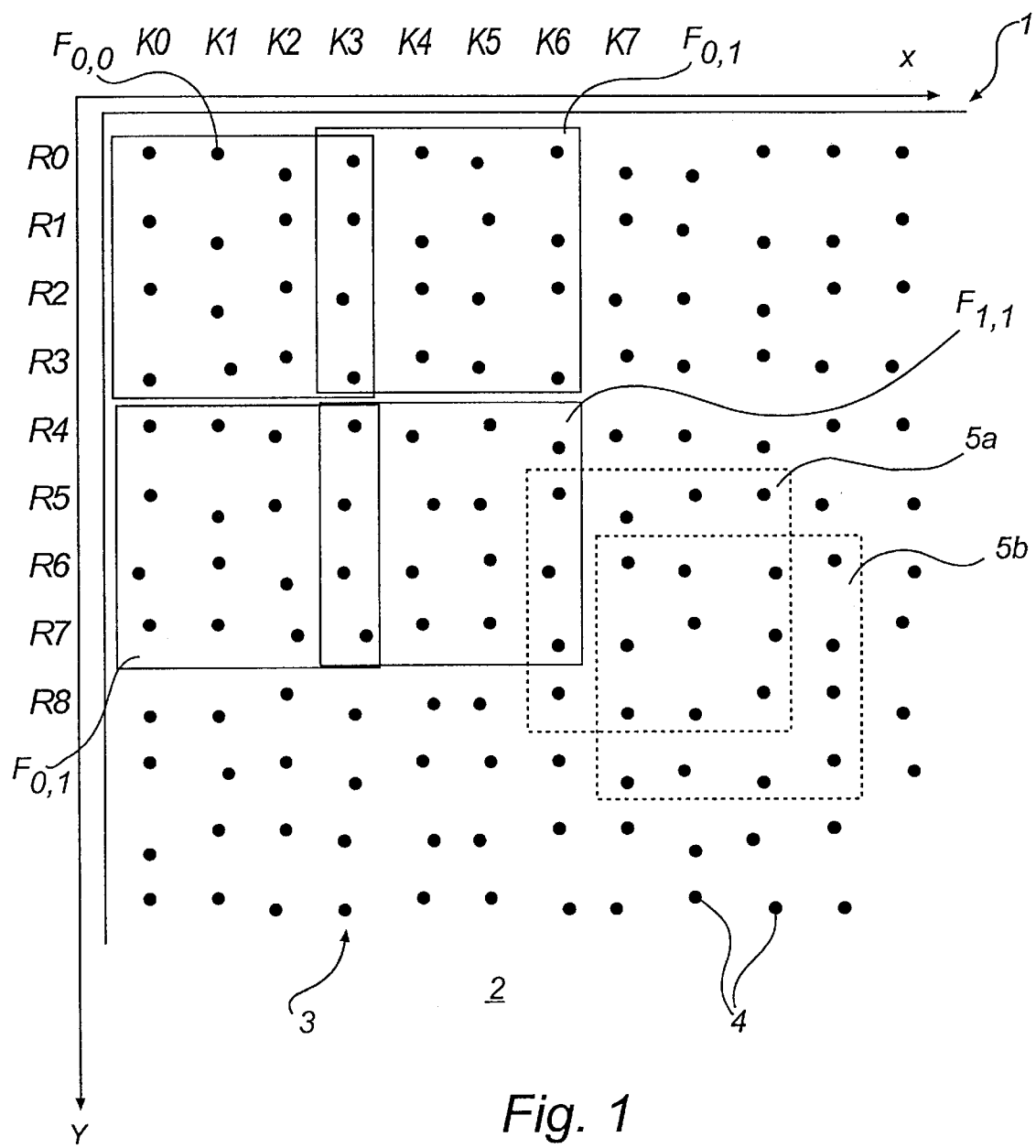
FIG. 1 shows schematically an embodiment of a product which is provided with a position-coding pattern.
Figure 2:
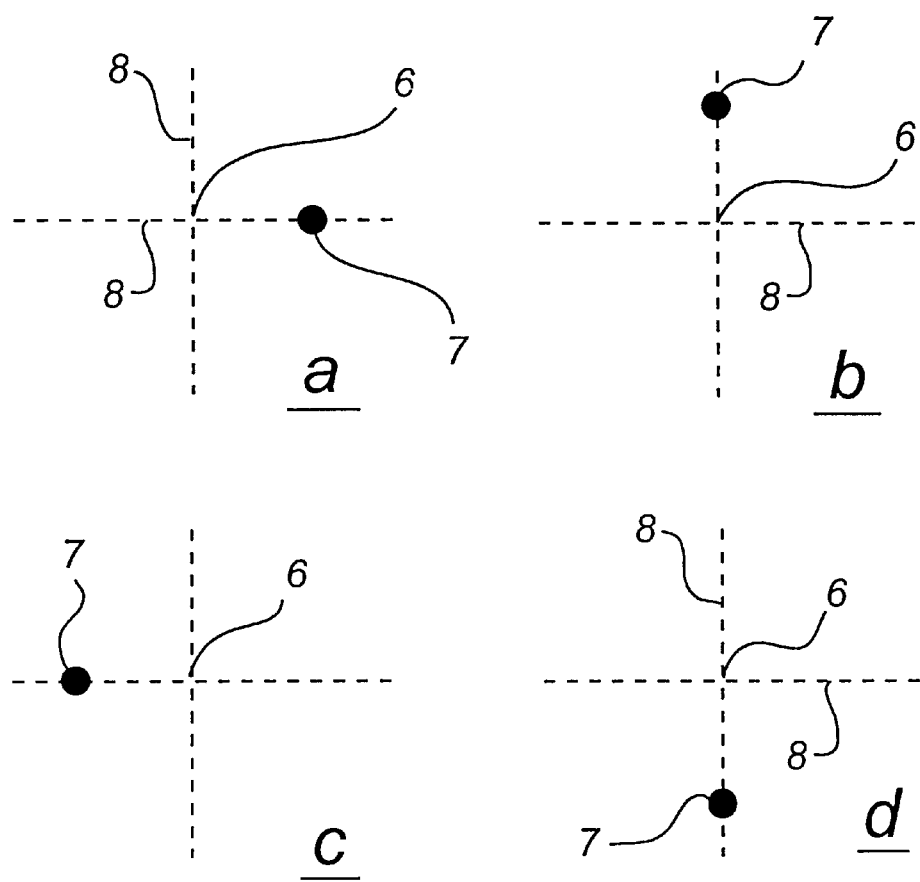
FIG. 2 shows schematically how the m arks can be designed and positioned in an embodiment of the invention.

FIG. 1 shows a part of a product in the form of a sheet of paper 1, which on at least part of its surface 2 is provided with an optically readable position-coding pattern 3 which makes possible position determination.

The position-coding pattern comprises marks 4, which are systematically arranged across the surface 2, so that it has a "patterned" appearance. The sheet of paper has an X-coordinate axis and a Y-coordinate axis. The position determination can be carried out on the whole surface of the product. In other cases the surface which enables position determination can constitute a small part of the product.

The pattern can, for example, be used to provide an electronic representation of information which is written or drawn on the surface. The electronic representation can be provided, while writing on the surface with a pen, by continuously determining the position of the pen on the sheet of paper by reading the position-coding pattern.

The position-coding pattern comprises a virtual raster, which is thus neither visible to the eye nor can be detected directly by a device which is to determine positions on the surface, and a plurality of marks 4, each of which, depending upon its location, represents one of four values "1" to "4" as described below. In this connection it should be pointed out that for the sake of clarity the position-coding pattern in FIG. 1 is greatly enlarged. In addition, it is shown arranged only on part of the sheet of paper.

The position-coding pattern is so arranged that the position of a partial surface on the total writing surface is determined unambiguously by the marks on this partial surface. A first and a second partial surface 5a, 5b are shown by broken lines in FIG. 1. The second partial surface partly overlaps the first partial surface. The part of the position-coding pattern (here 4*4 marks) on the first partial surface 5a codes a first position and the part of the position-coding pattern on the second partial surface 5b codes a second position. The position-coding pattern is thus partly the same for the adjoining first and second positions. Such a position-coding pattern is called "floating" in this application. Each partial surface codes a specific position.

FIGS. 2a–d show how a mark can be designed and how it can be located relative to its nominal position 6. The nominal position 6, which also can be called a raster point, is represented by the intersection of the raster lines 8. The mark 7 has the shape of a circular dot. A mark 7 and a raster point 6 can together be said to constitute a symbol.

In one embodiment, the distance between the raster lines is 300 µm and the angle between the raster lines is 90 degrees. Other raster intervals are possible, for example 254 µm to suit printers and scanners which often have a resolution which is a multiple of 100 dpi, which corresponds to a distance between points of 25.4 mm/100, that is 254 µm.

The value of the mark thus depends upon where the mark is located relative to the nominal position. In the example in FIG. 2 there are four possible locations, one on each of the raster lines extending from the nominal position. The displacement from the nominal position is the same size for all values.

Each mark 7 is displaced relative to its nominal position 6, that is no mark is located at the nominal position. In addition, there is only one mark per nominal position and this mark is displaced relative to its nominal position. This applies to the marks which make up the pattern. There can be other marks on the surface which are not part of the pattern and thus do not contribute to the coding. Such marks can be specks of dust, unintentional points or marks and intentional marks, from for example a picture or figure on the surface. Because the position of the pattern marks on the surface is so well-defined, the pattern is unaffected by such interference.

In one embodiment, the marks are displaced by 50 µm relative to the nominal positions 6 along the raster lines 8. The displacement is preferably ⅙ of the raster interval, as it is then relatively easy to determine to which nominal position a particular mark belongs. The displacement should be at least approximately ⅛ of the raster interval, otherwise it becomes difficult to determine a displacement, that is the requirement for resolution becomes great. On the other hand, the displacement should be less than approximately ¼ of the raster interval in order for it to be possible to determine to which nominal position a mark belongs.

The displacement does not need to be along the raster line, but the marks can be positioned in separate quadrants. However, if the marks are displaced along the raster lines, the advantage is obtained that the distance between the marks has a minimum which can be used to recreate the raster lines, as described in greater detail below.

Each mark consists of a more or less circular dot with a radius which is approximately the same size as the displacement or somewhat less. The radius can be 25% to 120% of the displacement. If the radius is much larger than the displacement, it can be difficult to determine the raster lines. If the radius is too small, a greater resolution is required to record the marks.

The marks do not need to be circular or round, but any suitable shape can be used, such as square or triangular, etc.

Normally, each mark covers a plurality of pixels on a sensor chip and, in one embodiment, the center of gravity of these pixels is recorded or calculated and used in the subsequent processing. Therefore the precise shape of the mark is of minor significance. Thus relatively simple printing processes can be used, provided it can be ensured that the center of gravity of the mark has the required displacement.

In the following, the mark in FIG. 2a represents the value 1, in FIG. 2b the value 2, in FIG. 2c the value 3 and in FIG. 2d the value 4.

Each mark can thus represent one of four values "1 to 4". This means that the position-coding pattern can be divided into a first position code for the x-coordinate and a second position code for the y-coordinate. The division is carried out as follows:

| Mark value | x-code | y-code |
| --- | --- | --- |
| 1 | 1 | 1 |
| 2 | 0 | 1 |
| 3 | 1 | 0 |
| 4 | 0 | 0 |

The value of each mark is thus converted into a first value, here bit, for the x-code and a second value, here bit, for the y-code. In this way two completely independent bit patterns are obtained by means of the pattern. Conversely, two or more bit patterns can be combined into a common pattern which is coded graphically by means of a plurality of marks in accordance with FIG. 2.

Each position is coded by means of a plurality of marks. In this example, 4*4 marks are used to code a position in two dimensions, that is an x-coordinate and a y-coordinate.

The position code is constructed by means of a number series of ones and zeros, a bit series, which has the characteristic that no four-bit-long bit sequence occurs more than once in the bit series. The bit series is cyclic, which means that the characteristic also applies when the end of the series is connected to its beginning. A four-bit sequence has thus always an unambiguously determined position number in the bit series.

The bit series can be a maximum of 16 bits long if it is to have the characteristic described above for bit sequences of four bits. In this example, however, only a seven-bit-long bit series is used, as follows:

"0 0 0 1 0 1 0".

This bit series contains seven unique bit sequences of four bits which code a position number in the series as follows:

| Position number in the series | Sequence |
| --- | --- |
| 0 | 0001 |
| 1 | 0010 |
| 2 | 0101 |
| 3 | 1010 |
| 4 | 0100 |
| 5 | 1000 |
| 6 | 0000 |

To code the x-coordinate, the bit series is written sequentially in columns over all the surface which is to be coded, where the left column $K_0$ corresponds to the x-coordinate zero (0). In one column the bit series can thus be repeated several times in succession.

the coding based on differences or position displacements between adjacent bit series in adjacent columns. The size of the difference is determined by the position number (that is the bit sequence) in the bit series with which the adjacent columns commence.

More precisely, if one takes the difference $\Delta_n$ modulo seven between, on the one hand, a position number which is coded by a four-bit sequence in a first column $K_n$ and which can thus have the value 0 to 6, and, on the other hand, a position number which is coded by an adjacent four-bit sequence at a corresponding "height" in an adjacent column $K_{n+1}$, the difference will be the same regardless of where, that is at what "height", along the two columns the difference is created. Using the difference between the position numbers for two bit sequences in two adjacent columns, it is thus possible to code an x-coordinate which is independent of and constant for all y-coordinates.

As each position on the surface is coded by a partial surface consisting of 4*4 marks in this example, there are four vertical bit sequences available and thus three differences, each with the value 0 to 6, for coding the x-coordinate.

The pattern is divided into code windows F with the characteristic that each code window consists of 4*4 marks. There are thus four horizontal bit sequences and four vertical bit sequences available, so that three differences can be created in the x-direction and four positions can be obtained in the y-direction. These three differences and four positions code the position of the partial surface in the x-direction and the y-direction. Adjacent windows in the x-direction have a common column, see FIG. 1. Thus the first code window $F_{0,0}$ contains bit sequences from the columns $K_0, K_1, K_2, K_3$, and bit sequences from the rows $R_0, R_1, R_2, R_3$. As differences are used in the x-direction, the next window diagonally in the x-direction and y-direction, the window $F_{1,1}$, contains bit sequences from the columns $K_3, K_4, K_5, K_6$, and the rows $R_4, R_5, R_6, R_7$. Considering the coding in just the x-direction, the code window can be considered to have an unlimited extent in the y-direction. Correspondingly, considering the coding in just the y-direction, the code window can be considered to have an unlimited extent in the x-direction. Such a first and second code window with unlimited extent in the y-direction and x-direction respectively together form a code window of the type shown in FIG. 1, for example $F_{0,0}$.

Each window has window coordinates $F_x$, which give the position of the window in the x-direction, and $F_y$, which give the position of the window in the y-direction. Thus the correspondence between the windows and columns is as follows.

$$K_i = 3F_x$$

$$R_j = 4F_y$$

where $K_i$ is the first column and $R_j$ is the first row in the code window concerned.

The coding is carried out in such a way that for the three differences, one of the differences $\Delta_0$ always has the value 1 or 2, which indicates the least significant digit $S_0$ for the number which represents the position of the code window in the x-direction, and both the other differences $\Delta_1, \Delta_2$, have values in the range 3 to 6, which indicates the two most significant digits $S_1, S_2$, for the coordinate of the code window. Thus no difference can be zero for the x-coordinates, as that would result in too symmetrical a code pattern. In other words, the columns are coded so that the differences are as follows:

(3 to 6); (3 to 6); (1 to 2); (3 to 6); (3 to 6); (1 to 2); (3 to 6); (3 to 6); (1 to 2); (3 to 6); (3 to 6); . . .

Each x-coordinate is thus coded by two differences $\Delta_1, \Delta_2$ of between 3 and 6 and a subsequent difference $\Delta_0$ which is 1 or 2. By subtracting one (1) from the least difference $\Delta_0$ and three (3) from the other differences, three digits are obtained, $S_2, S_1, S_0$, which in a mixed base directly give the position number of the code window in the x-direction, from which the x-coordinate can then be determined directly, as shown in the example below. The position number of the code window is:

$$S_2*(4*2)+S_1*2+S_0*1$$

Using the principle described above, it is thus possible to code code windows 0, 1, 2, . . . , 31, using a position number for the code window consisting of three digits which are represented by three differences. These differences are coded by a bit pattern which is based on the number series above. The bit pattern can finally be coded graphically by means of the marks in FIG. 2.

In many cases, when a partial surface is recorded consisting of 4*4 marks, a complete position number which codes the x-coordinate will not be obtained, but parts of two position numbers, as the partial surface in many cases does not coincide with one code window but covers parts of two adjacent code windows in the x-direction. However, as the difference for the least significant digit $S_0$ of each number is always 1 or 2, a complete position number can easily be reconstructed, as it is known what digit is the least significant.

The y-coordinates are coded in accordance with approximately the same principle as that used for the x-coordinates by means of code windows. The cyclic number series, that is the same number series as is used for the x-coding, is written repeatedly in horizontal rows across the surface which is to be position coded. Precisely as for the x-coordinates, the rows are made to start in different positions, that is with different bit sequences, in the number series. For the y-coordinates, however, differences are not used, but the coordinates are coded by values which are based on the start position of the number series in each row. When the x-coordinate has been determined for a partial surface with 4*4 marks, the start positions in the number series can in fact be determined for the rows which are included in the y-code for the 4*4 marks.

In the y-code, the least significant digit $S_0$ is determined by letting this be the only digit which has a value in a particular range. In this example, a row of four starts in position 0 to 1 in the number series, in order to indicate that this row concerns the least significant digit $S_0$ in a code window, and the three other rows start in any of the positions 2 to 6 in order to indicate the other digits $S_1$ $S_2$ $S_3$ in the code window. In the y-direction there is thus a series of values as follows:

(2 to 6); (2 to 6); (2 to 6); (0 to 1); (2 to 6); (2 to 6); (2 to 6); (0 to 1); (2 to 6) . . .

Each code window is thus coded by three values between 2 and 6 and a subsequent value between 0 and 1.

If zero (0) is subtracted from the low value and two (2) from the other values, a position in the y-direction $S_3$ $S_2$ $S_1$ $S_0$ in mixed base is obtained, in a way similarly to the x-direction, from which the position number of the code window can be determined directly, which is:

$$S_3*(5*5*2)+S_2*(5*2)+S_1*2+S_0*1$$

Using the method above, it is possible to code 4*4* 2=32 position numbers in the x-direction for the code windows. Each code window comprises bit sequences from three columns, which gives 3*32=96 columns or x-coordinates. In addition, it is possible to code 5*5*5*2=250 position numbers in the y-direction for the code windows. Each such position number comprises horizontal bit sequences from 4 rows, which gives 4*250=1000 rows or y-coordinates. In total it is thus possible to code 96000 coordinate positions.

As the x-coding is based on differences, it is, however, possible to select the position in which the first number series in the first code window starts. If it is taken into account that this first number series can start in seven different positions, it is possible to code 7*96000=672000 positions. The start position of the first number series in the first column $K_0$ can be calculated when the x- and y-coordinates have been determined. The above-mentioned seven different start positions for the first series can code different pages or writing surfaces of a product.

Theoretically, a partial surface with 4*4 symbols, which each have four values, can code $4^{4*4}$ positions, that is 4,294,967,296 positions. In order to make possible floating determination of the position of a partial surface, there is thus a redundancy factor in excess of 6000 (4294967296/ 672000).

The redundancy consists partly in the restrictions on the size of the differences, and partly in only seven bits out of 16 being used in the position code. This latter fact can, however, be used to determine the rotational position of the partial surface. If the next bit in the bit series is added to the four-bit sequence, a five-bit sequence is obtained. The fifth bit is obtained by reading the adjacent bit immediately outside the partial surface which is being used. Such an additional bit is often easily available.

The partial surface which is read by the sensor can have four different rotational positions, rotated through 0, 90, 180 or 270 degrees relative to the code window. In those cases where the partial surface is rotated, the reading of the code will, however, be such that the code read will be inverted and reversed in either the x-direction or the y-direction or both, in comparison to the case where it had been read at 0 degrees. This assumes, however, that a slightly different decoding of the value of the marks is used according to the table below.

| Mark value | x-code | y-code |
|---|---|---|
| 1 | 0 | 0 |
| 2 | 1 | 0 |
| 3 | 1 | 1 |
| 4 | 0 | 1 |

The above-mentioned five-bit sequence has the characteristic that it only occurs the right way round and not in inverted and reversed form in the seven-bit series. This is apparent from the fact that the bit series (0 0 0 1 0 1 0) contains only two "ones". Therefore all five-bit sequences must contain at least three zeros, which after inversion (and reversing, if any) results in three ones, which cannot occur. Thus if a five-bit sequence is found which does not have a position number in the bit series, it can be concluded that the partial surface should probably be rotated and the new position tested.

In order to provide further illustrations of the invention according to this embodiment, here follows a specific example which is based on the described embodiment of the position code.

Figure 3:
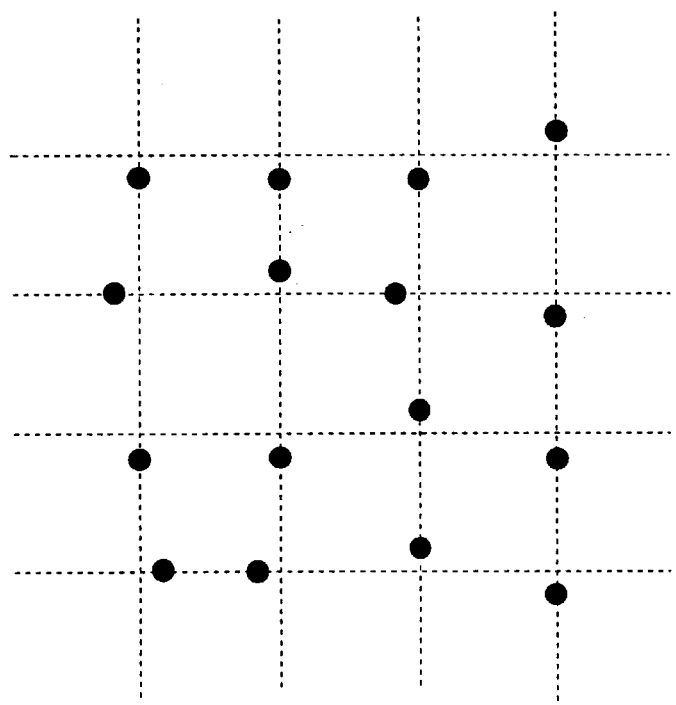
FIG. 3 shows schematically an example of 4*4 symbols which are used to code a position.

FIG. 3 shows an example of an image with 4*4 marks which are read by a device for position determination.

These 4*4 marks have the following values:

```
4 4 4 2
3 2 3 4
4 4 2 4
1 3 2 4
```

These values represent the following binary x- and y-codes:

| x-code: | y-code: |
|---------|---------|
| 0 0 0 0 | 0 0 0 1 |
| 1 0 1 0 | 0 1 0 0 |
| 0 0 0 0 | 0 0 1 0 |
| 1 1 0 0 | 1 0 1 0 |

The vertical bit sequences in the x-code code the following positions in the bit series: 2 0 4 6. The differences between the columns are −2 4 2, which modulo 7 gives: 5 4 2, which in mixed base codes the position number of the code window: $(5-3)*8+(4-3)*2+(2-1)=16+2+1=19$. The first coded code window has the position number 0. Thus the difference which lies in the range 1 to 2 and which appears in the 4*4 marks of the partial surface is the twentieth such difference. As additionally there are in total three columns for each such difference and there is a start column, the vertical sequence furthest to the right in the 4*4 x-code belongs to the 61st column (column 60) in the x-code ($3*20+1=61$) and the vertical sequence furthest to the left belongs to the 58th column (column 57).

The horizontal bit sequences in the y-code code the positions 0 4 1 3 in the number series. As these horizontal bit sequences start in the 58th column, the start position of the rows is the value of these minus 57 modulo 7, which gives the start positions 6 3 0 2. Converted to digits in the mixed base, this becomes 6−2, 3−2, 0−0, 2−2=4 1 0 0, where the third digit is the least significant digit in the number concerned. The fourth digit is then the most significant digit in the next number. It must in this case be the same as in the number concerned. (The exception is when the number concerned consists of the highest possible digits in all positions. Then it is known that the beginning of the next number is one greater than the beginning of the number concerned.)

The position number is in mixed base $0*50+4*10+1*2+0*1=42$.

The third horizontal bit sequence in the y-code thus belongs to the 43rd code window which has a start position 0 or 1, and as there are four rows in total for each such code window, the third row is number $43*4=172$.

In this example, the position of the top left corner of the partial surface with 4*4 marks is (58,170).

As the vertical bit sequences in the x-code in the 4*4 group start at row 170, the whole pattern's x-columns start in the positions of the number series ((2 0 4 6)−169) modulo 7=1 6 3 5. Between the last start position (5) and the first start position the numbers 0–19 are coded in the mixed base, and by adding the representations of the numbers 0–19 in the mixed base the total difference between these columns is obtained. A naive algorithm for doing this is to generate these twenty numbers and directly add their digits. Call the sum obtained s. The page or writing surface is then given by (5−s)modulo7.

An alternative method for determining which bit is the least significant in a partial surface in order to be able to identify a code window in this way is as follows. The least significant bit (LSB) is defined as the digit which is the lowest in a partial surface's differences or row position number. In this way the reduction (redundancy) of the maximum useable number of coordinates is relatively small. For example, the first code windows in the x-direction in the example above can all have LSB=1 and other digits between 2 and 6, which gives 25 code windows, the next can have LSB=2 and other digits between 3 and 6, which gives 16 code windows, the next can have LSB=3 and other digits between 4 and 6, which gives 9 code windows, the next can have LSB=4 and other digits between 5 and 6, which gives 4 code windows, the next can have LSB=5 and other digits 6, which gives 1 code window, that is a total of 55 code windows, compared to 32 in the example above.

In the example above, an embodiment has been described where each code window is coded by 4*4 marks and a number series with 7 bits is used. This is of course only one example. Positions can be coded by more or fewer marks. There does not need to be the same number in both directions. The number series can be of different length and does not need to be binary, but can be based on a different base, for example hex code. Different number series can be used for coding in the x-direction and coding in the y-direction. The marks can represent different numbers of values.

In a practical example, a partial surface is used consisting of 6*6 marks and where the bit series as a maximum can consist of $2^6$ bits, that is 64 bits. However, a bit series consisting of 51 bits is used, and consequently 51 positions, in order to have the ability to determine the rotational position of the partial surface. An example of such a bit series is:

```
0 0 0 0 0 1 1 0 0 0 1 1 1 1 1 0 1 0 1 0 1 1 0 1 1 0 0 1 1
0 1 0 0 0 1 0 1 0 0 1 1 1 0 1 1 1 1 0 0 1 0
```

Such a partial surface consisting of six by six marks can theoretically code $4^{6*6}$ positions, which with the above-mentioned raster dimensions of 0.3 mm is an extremely large surface.

In a similar way as described above for the seven-bit series, according to the present invention the characteristic is utilized that the partial surface is enlarged to include one bit on each side of the partial surface, at least at its center, so that for the third and fourth rows in the partial surface of 6*6 symbols, 8 symbols are read, one on each side of the partial surface, and similarly in the y-direction. The above-mentioned bit series which contains 51 bits has the characteristic that a bit sequence of 6 bits occurs only once and that a bit sequence of 8 bits which contains the above-mentioned bit sequence of 6 bits occurs only once and never in an inverted position or reversed and inverted. In this way, the rotational position of the partial surface can be determined by reading eight bits in row 3, row 4, column 3 and/or column 4. When the rotational position is known, the partial surface can be rotated to the correct position before the processing is continued.

It is desirable to obtain a pattern which is as random as possible, that is where areas with excessive symmetry do not occur. It is desirable to obtain a pattern where a partial surface with 6*6 marks contains marks with all the different positions in accordance with FIGS. 2a to 2d. In order to increase the randomness further or avoid repetitive characteristics, a method can be used which is called "shuffle". Each horizontal bit sequence starts in a predetermined start position. However, it is possible to displace the start position in the horizontal direction for each row, if the displacement is known. This can be carried out by each least significant bit (LSB) being allocated a separate displacement vector for the adjacent rows. The displacement vector states by how much each row is displaced in the horizontal direction. Visually it can be regarded as if the y-axis in FIG. 1 is "spiky".

In the example above, with a 4*4 code window, the displacement vector can be 1, 2, 4, 0 for LSB=0 and 2, 2, 3, 0 for LSB=1. This means that after subtracting the number 2 and 0 respectively, the above displacement is to be subtracted (modulo five) from the bit sequence's position number, before the processing continues. In the example above, for the y-coordinate the digits 4 1 0 0 ($S_2$, $S_1$, $S_0$, $S_4$) are obtained in the mixed base, where the second digit from the right is the least significant digit, LSB. As the displacement vector 1, 2, 4, 0 is to be used (LSB=0) for the digits 4 and 1, 2 is subtracted from 4 to give $S_2$=2 and 4 is subtracted from 1 (modulo five) to give $S_1$=2. The digit $S_0$=0 remains unchanged (the displacement vector's component for the least significant digit is always zero). Finally, the digit $S_4$ belongs to the next code window, which must have LSB=1, that is the second displacement vector is to be used. Thus 2 is subtracted from 0 (modulo five) which gives $S_4$=3.

A similar method can be used to change the codes for the x-coordinates. However, there is less need to change the x-coordinates, as they are already relatively randomly distributed, as the difference zero is not used, in the example above.

In the example above, the mark is a dot. Naturally it can have a different appearance. It can, for example, consist of a line or an ellipse, which starts at the virtual raster point and extends from this to a particular position. Other symbols than a dot can be used, such as a square, rectangle, triangle, circle or ellipse, filled-in or not.

In the example above, the marks are used within a square partial surface for coding a position. The partial surface can be another shape, for example hexagonal. The marks do not need to be arranged along the raster lines in an orthogonal raster but can also be arranged in other manners, such as along the raster lines in a raster with 60 degree angles, etc. A polar coordinate system can also be used.

Figure 5:
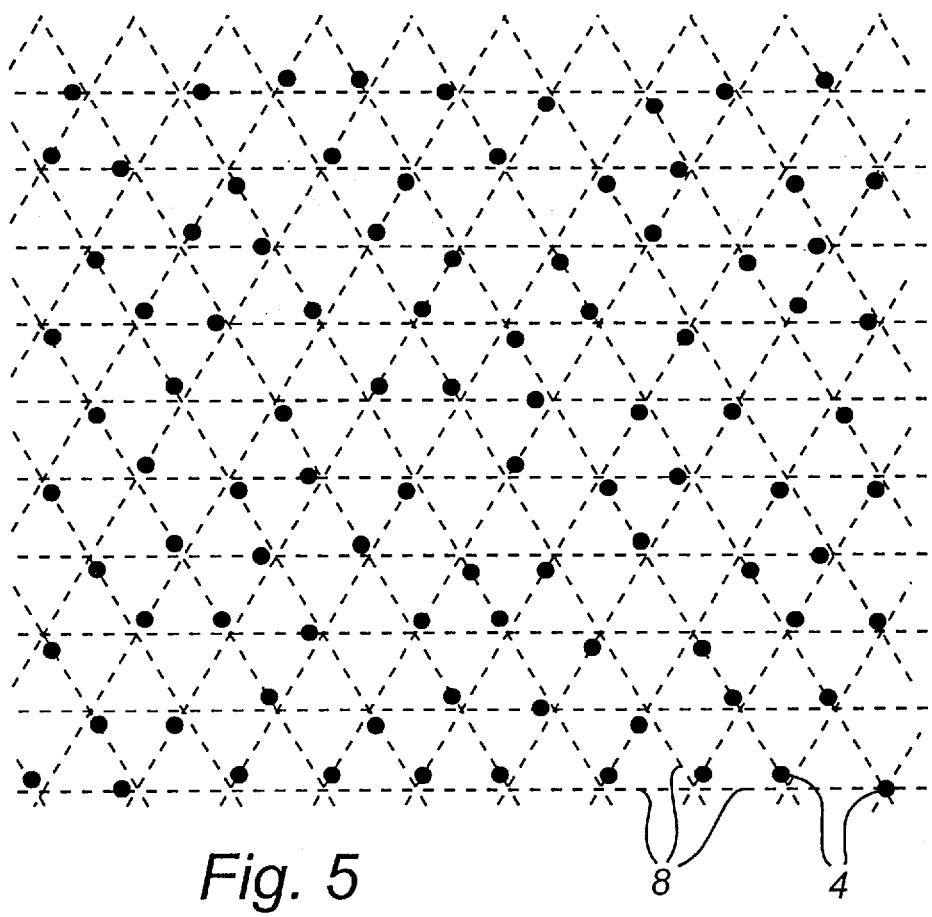
FIG. 5 shows schematically a position-coding pattern with a triangular raster.
Figure 6:
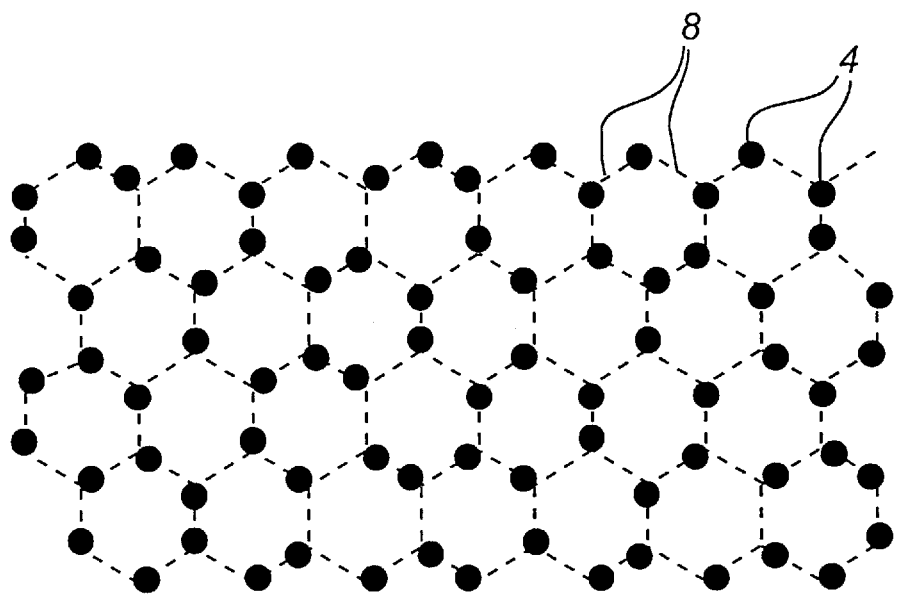
FIG. 6 shows schematically a position-coding pattern with a hexagonal raster.

Rasters in the form of triangles or hexagons can also be used, as shown in FIGS. 5 and 6. For example, a raster with triangles, see FIG. 5, enables each mark to be displaced in six different directions, which provides even greater possibilities, corresponding to $6^{6*6}$ partial surface positions. For a hexagonal raster, FIG. 6, a honeycomb pattern, each mark can be displaced in three different directions along the raster lines.

As mentioned above, the marks do not need to be displaced along the raster lines but can be displaced in other directions, for example in order to be located each in a separate quadrant when using a square raster pattern. In the hexagonal raster pattern the marks can be displaced in four or more different directions, for example in six different directions along the raster lines and along lines which are at 60 degrees to the raster lines.

In order for the position code to be able to be detected, it is necessary for the virtual raster to be determined. This can be carried out, in a square raster pattern, by examining the distance between different marks. The shortest distance between two marks must originate from two adjacent marks with the values 1 and 3 in the horizontal direction or 2 and 4 in the vertical direction, so that the marks lie on the same raster line between two raster points. When such a pair of marks has been detected, the associated raster points (the nominal positions) can be determined using knowledge of the distance between the raster points and the displacement of the marks from the raster points. Once two raster points have been located, additional raster points can be determined using the measured distance to other marks and from knowledge of the distance between the raster points.

If the marks are displaced 50 $\mu$m along the raster lines, which are a distance of 300 $\mu$m apart, the least distance between two marks will be 200 $\mu$m, for example between marks with the values 1 and 3. The next smallest distance arises between, for example, marks with the values 1 and 2, and is 255 $\mu$m. There is therefore a relatively distinct difference between the least and the next smallest distance. The difference to any diagonals is also great. However, if the displacement is larger than 50 $\mu$m, for example more than 75 $\mu$m (¼), diagonals can cause problems and it can be difficult to determine to which nominal position a mark belongs. If the displacement is less than 50 $\mu$m, for example less than approximately 35 $\mu$m (⅛), the least distance will be 230 $\mu$m, which does not give a very large difference to the next distance, which is then 267 $\mu$m. In addition, the demands on the optical reading increase.

The marks should not cover their own raster point and should therefore not have a larger diameter than twice the displacement, that is 200%. This is, however, not critical, and a certain overlapping can be permitted, for example 240%. The least size is determined in the first place by the resolution of the sensor and the demands of the printing process used to produce the pattern. However, the marks should not have a smaller diameter than approximately 50% of the displacement in practice, in order to avoid problems with particles and noise in the sensor.

Figure 4:
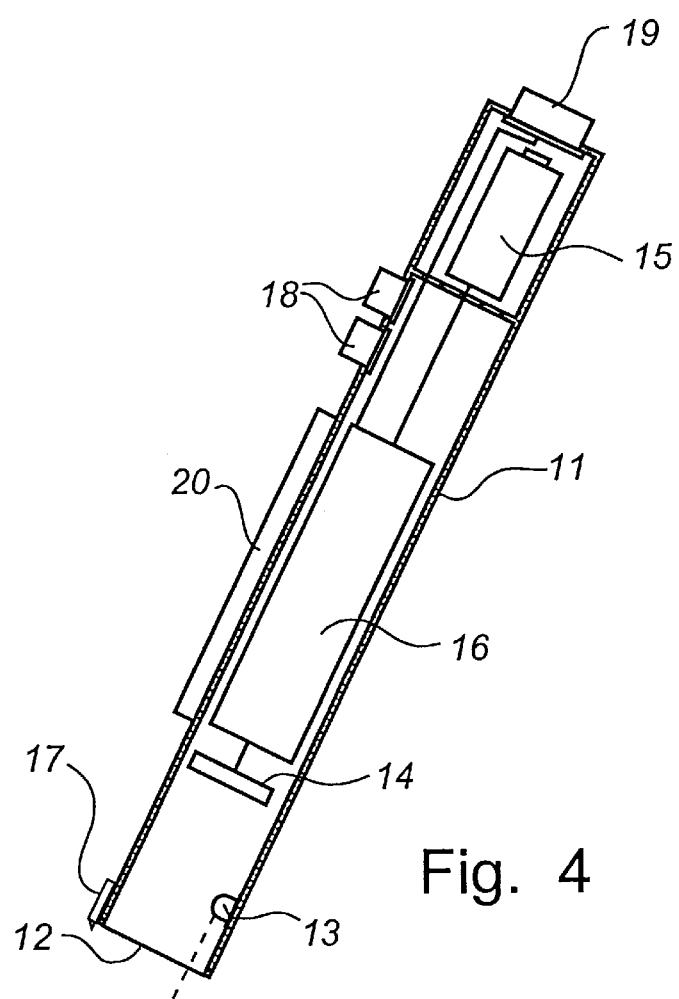
FIG. 4 shows schematically a device which can be used f or position determination.

An embodiment of a device for position determination is shown schematically in FIG. 4. It comprises a casing 11 which has approximately the same shape as a pen. In the short side of the casing there is an opening 12. The short side is intended to abut against or to be held a short distance from the surface on which the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. If required, the device can also contain an optical system, such as a mirror and/or lens system. The light-emitting diode can be an infrared light-emitting diode and the sensor can be sensitive to infrared light.

The power supply for the device is obtained from a battery 15, which is mounted in a separate compartment in the casing.

The electronic circuitry part contains image-processing means 16 for determining a position on the basis of the image recorded by the sensor 14 and in particular a processor unit with a processor which is programmed to read images from the sensor and carry out position determination on the basis of these images.

In this embodiment, the device also comprises a pen point 17, with the aid of which ordinary pigment-based writing can be written on the surface on which the position determination is to be carried out. The pen point 17 is extendable and retractable so that the user can control whether or not it is to be used. In certain applications the device does not need to have a pen point at all.

The pigment-based writing is suitably of a type that is transparent to infrared light and the marks suitably absorb infrared light. By using a light-emitting diode which emits infrared light and a sensor which is sensitive to infrared light, the detection of the pattern can be carried out without the above-mentioned writing interfering with the pattern.

The device also comprises buttons 18, by means of which the device can be activated and controlled. It has also a transceiver 19 for wireless transmission, for example using infrared light, radio waves or ultrasound, of information to and from the device. The device can also comprise a display 20 for displaying positions or recorded information.

A device for recording text is described in Applicant's Swedish Patent No. 9604008-4. This device can be used for position determination if it is programmed in a suitable way. If it is to be used for pigment-based writing, then it must also be given a pen point.

The device can be divided between different physical casings, a first casing containing components which are required for recording images of the position-coding pattern and for transmitting these to components which are contained in a second casing and which carry out the position determination on the basis of the recorded image(s).

As mentioned, the position determination is carried out by a processor which thus must have software for locating marks in an image and decoding them and for determining positions from the codes thus obtained. A person skilled in the art will be able, based on the example above, to design software which carries out position determination on the basis of an image of a part of a position-coding pattern.

In addition, on the basis of the description above, a person skilled in the art will be able to design software for printing out the position-coding pattern.

In the embodiment above, the pattern is optically readable and the sensor is therefore optical. As mentioned, the pattern can be based on a parameter other than an optical parameter. In such a case the sensor must of course be of a type which can read the parameter concerned. Examples of such parameters are chemical, acoustic or electromagnetic marks. Capacitive or inductive marks can also be used.

In the embodiment above, the raster is an orthogonal grid. It can also have other forms, such as a rhombic grid, for example with 60 degree angles, a triangular or hexagonal grid, etc.

Displacement in more or less than four directions can be used, for example displacement in three directions along a hexagonal virtual raster. In an orthogonal raster only two displacements can be used, in order to facilitate the recreation of the raster. However, a displacement in four directions is preferred, but six or eight directions are also possible within the scope of the invention.

In the embodiment above, the longest possible cyclic number series is not used. As a result, a degree of redundancy is obtained which can be used in various ways, for example to carry out error correcting, replace missing or hidden marks, etc.

Determination of the Raster

Figure 7:
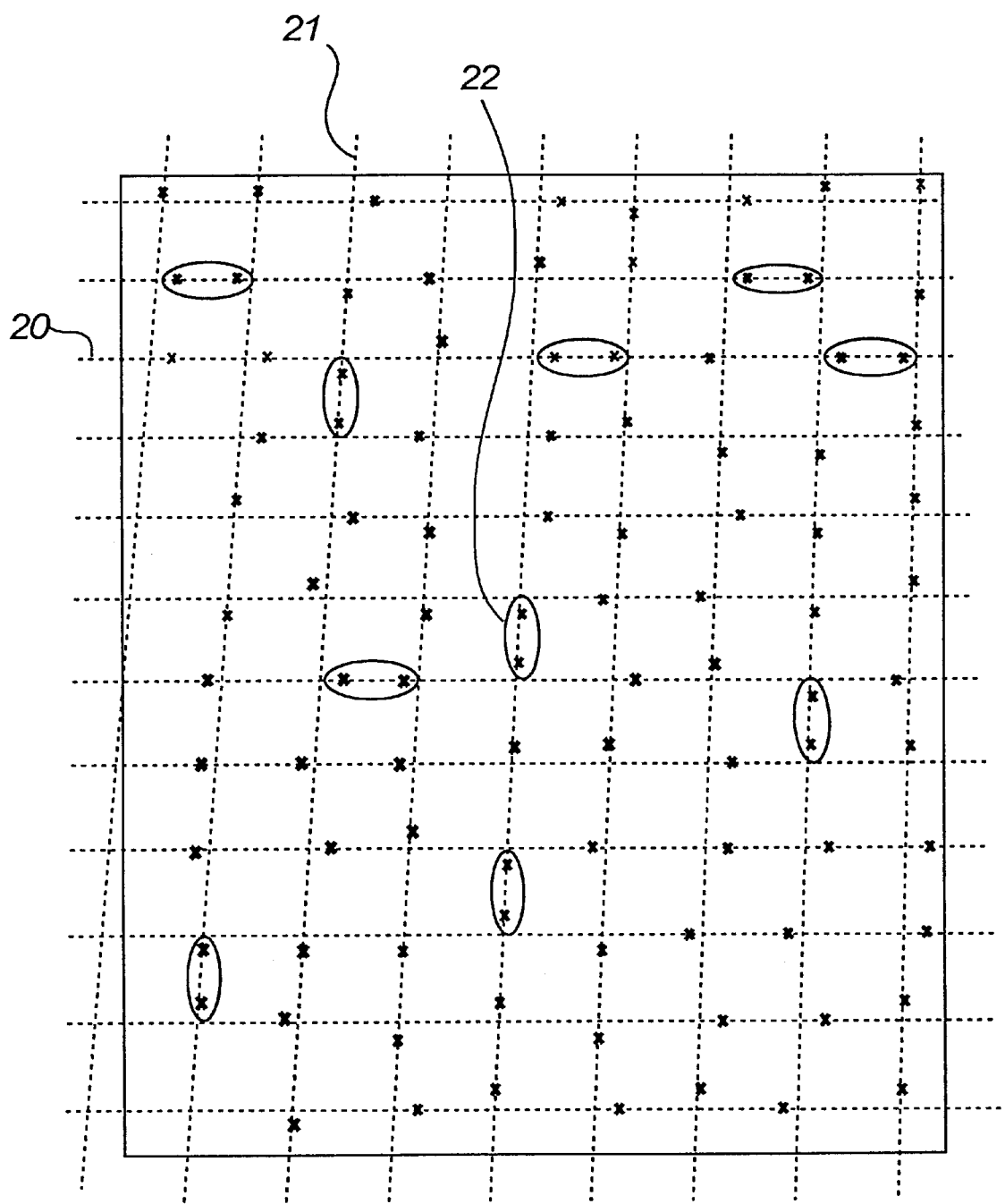
FIG. 7 shows schematically an image which is obtained on a sensor surface and which has been image-processed according to this invention, the virtual raster being added by dotted lines.
Figure 8:
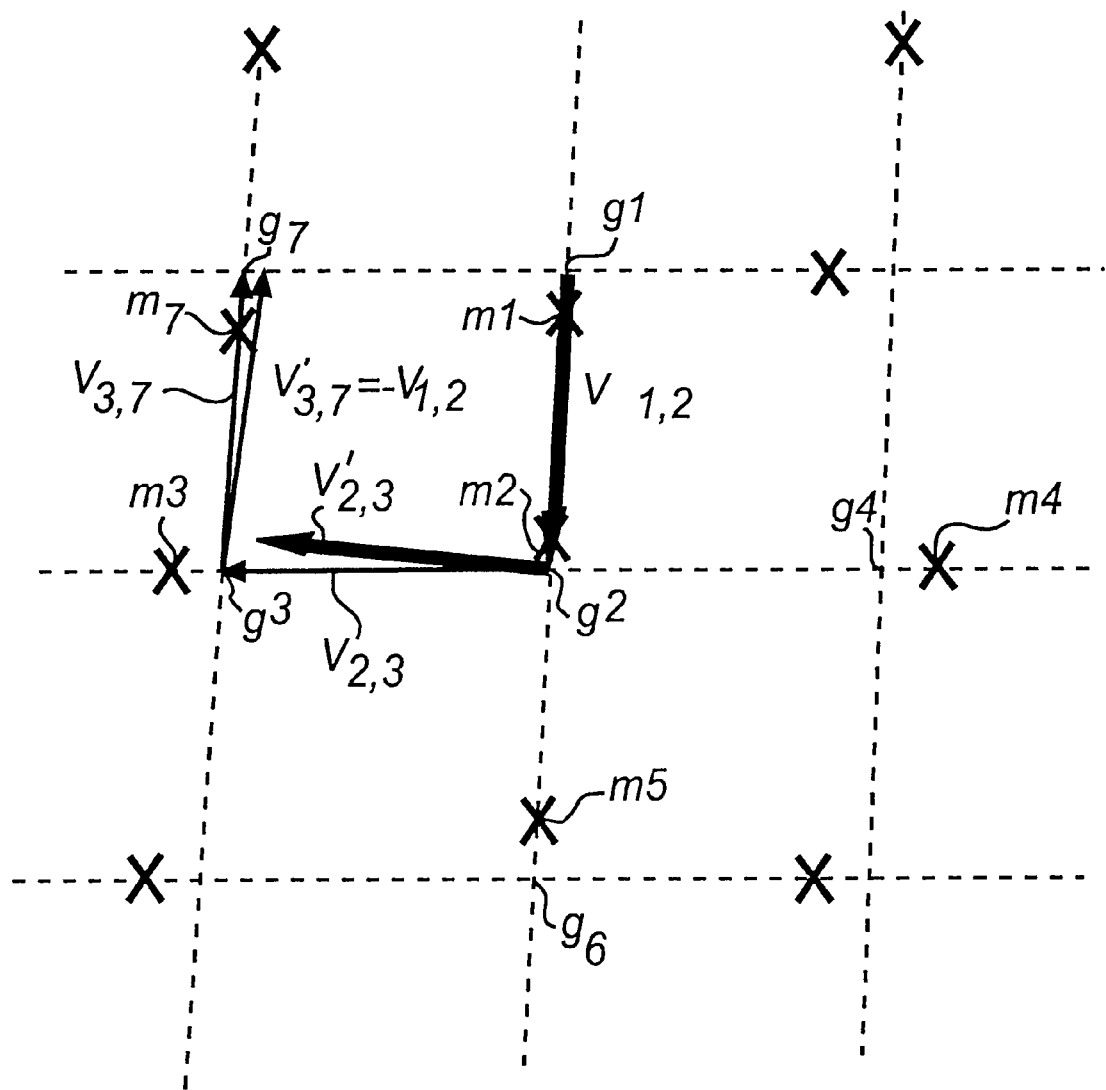
FIG. 8 shows an enlarged detail view of part of FIG. 7.

With reference to FIGS. 7 and 8 a method will now be described for determining the virtual raster in a code pattern constructed around an orthogonal raster grid.

A subset of the position-coding pattern is read by the sensor and an image is provided on the sensor. The image consists of several marks, each of which covers several pixels. Normally, according to the invention, a sensor surface is used with approximately 160 by 160 usable pixels. About 10 to 12 marks are obtained in each direction for each partial surface which is detected by the sensor. The sensor provides a new image every tenth millisecond, that is approximately 100 images per second.

The image which is obtained is a gray-scale image, and this image is processed using a thresholding method so that the marks are clearly distinguished. In addition the center of gravity is calculated for the marks, so that coordinates of the marks are obtained on the sensor surface, for example to an accuracy of $\frac{1}{256}$ pixel distance. An example of a thus-processed image is shown in FIG. 7. The image now consists of a number of points with determined positions, which were obtained from the sensor image.

As shown in FIG. 7, the marks are not located along an orthogonal grid with an equal distance between the raster lines. The reason is that the image on the sensor surface is usually obtained with a certain perspective, which compresses the distance between the raster lines in one direction and also creates an angle between the raster lines. As the marks are also displaced by $\frac{1}{6}$ of the distance between the raster lines in any of four orthogonal directions, it is no simple task to recreate the raster lines. The marks can also be rotated, so that the raster lines are not usually parallel with the side edges of the sensor surface.

In FIG. 7 the horizontal raster lines 20 are compressed so that the distance between them is less than the distance between the vertical raster lines 21. The vertical raster lines are at an angle to each other, so that they meet in a position vertically above the sensor surface. By horizontal and vertical is meant the positions in FIG. 7.

In order to recreate the raster, the characteristic is used that the shortest distance between two marks is the distance where the positions of the marks have the values 1 and 3 respectively in the horizontal direction, or 2 and 4 respectively in the vertical direction. In FIG. 7 eleven (11) such pairs of marks are encircled.

According to the invention, one such pair is used as the starting point for recreating the raster. A pair of marks $m_1$, $m_2$ is selected, for example close to the center of the sensor surface, for example the pair marked by the ellipse 22. The distance between the marks is determined and a first vector $V_{1,2}$ is calculated, the direction of which is determined by the coordinates of the marks and the length of which is the distance between the marks multiplied by 1.5. The vector is calculated so that it extends through the marks and an equal distance out on each side. The ends of the vector thereby indicate the two intersections $g_1$ and $g_2$ of the raster lines.

One of the raster points $g_2$ can be taken as the starting point for a second vector $V_{2,3}$, a third vector $V_{2,4}$, and a fourth vector $V_{2,4}$, which are at an angle of 90 degrees, −90 degrees and 0 degrees respectively to the first vector and are the same length as the first vector. The third vector is placed on a first stack for possible later use and the fourth vector is placed on a second stack for possible later use.

It is investigated whether there is a mark around the end of the second vector, whereby the mark $m_3$ is found. As the distance between the end of the vector $V_{2,3}$ and the mark $m_3$ is large and as the mark $m_3$ lies approximately in the direction of the vector, the mark is calculated as a mark with the value 3.

Subsequently the actual position of the intersection $g_3$ of the raster is calculated, by using the value of the mark. The distance to the nominal position of the mark is $\frac{1}{6}$ of the distance between the raster points. The value of the mark determines the direction to the raster point. In this way the raster point can be determined unambiguously. Then the vector $V_{2,3}$ is adjusted to the correct length and direction in order to fit between the raster points. In this way the intersection $g_3$ is validated and stored in a memory of valid raster points.

The third vector $V_{2,4}$ and the fourth vector $V_{2,5}$, which were placed on the stacks, can be used if the vector $V_{2,3}$ does not result in a valid raster point.

The new valid raster point $g_3$ is taken as the starting point for a fifth vector $V_{3,6}$, a sixth vector $V_{3,7}$ and a seventh vector $V_{3,8}$, each at angles of 90 degrees, −90 degrees and 0 degrees relative to the third vector, and the sixth and seventh vectors are placed on the stack. The length and direction of the fifth vector are the same as for the first vector, that is the last but one determined vector (in the same direction). For the seventh vector, the length and direction of the second vector, that is the last determined in the same direction, are used.

Close to the end of the fifth vector is found the sixth mark $m_6$, which has the position value 4. Using the value and coordinates of the sixth mark, the length and direction of the fifth vector are adjusted to obtain the correct length and direction. The sixth raster point is thus validated and can be stored in the raster-point memory.

The process is continued until the new vector points to a raster point that has already been determined. Then the vector is used instead which is at a −90 degree angle relative to the preceding vector and which is at the top of the stack. If this cannot be used either, the process is continued down the stack until all the raster points have been determined. If the stack is finished, the second stack is used with vectors with zero-direction.

If no interpretable result is obtained from the first vector determination, it can be taken that the initial vector was incorrect in some way or other and the procedure is restarted with a new initial vector.

In certain exceptional cases, an initial vector which does not consist of the vector between the mark values 1 and 3 or 2 and 4 can lead to usable results. However, the initial vector's raster points are not used as validated raster points, but these two first raster points are determined at a later stage based on validated raster points. It is thus immaterial which initial vector is used, provided a usable result is obtained.

As the process is implemented one step at a time and valid raster points are determined for each mark, any angle deviations between the raster lines are of minor significance. The method according to the invention can be used with good results even with relatively strong perspectives and resultant oblique rasters.

The method according to the invention is also suitable for use with rasters with angles other than 90 degrees, for example with triangular rasters.

It is stated above that the third vector, at −90 degrees relative to the first vector, is placed on the stack for possible later use. It is also possible to use this third vector directly after the second vector has been used, the stack being of the type first-in-first-out (FIFO) and the stack is emptied before new vectors are created. A normal stack is otherwise of the type last-in-first-out (LIFO). Other intermediate variants are also possible. It is also possible to use first the vector that is at the angle of −90 degrees and then the other.

It will be appreciated that if a stack of the type LIFO is used, the process will progress through the marks in an essentially spiral movement, until an edge of the sensor surface is reached. Subsequently the remaining parts of the sensor surface are searched. In the case of FIFO the searching progresses instead in a tree-like pattern. Both methods lead quickly to usable results.

The invention has been described above with reference to a preferred embodiment of the invention. However, the method according to the invention can be used for other types of raster, such as triangular or honeycomb rasters, with minor modifications. For a hexagonal raster, the vector is calculated based on the coordinates of the marks found, but of course taking into effect the angles and distances which apply to the hexagonal raster.

In an embodiment of the invention, the sensor surface or the coordinates of the marks are searched starting from the top left corner of the sensor surface and going towards the right, then the next row, until a pair of coordinates with suitable characteristics has been found.

In a variant of the invention, all the distances between the marks are first calculated, before the least distance is selected.

In a further variant of the invention, different initial lengths of the vector are used, depending upon whether it goes in the horizontal or vertical direction, in order to make possible decoding of a pattern with strong perspective. A difference in distance between the coordinates in the horizontal or vertical direction can often be determined as early as during the initial determination of the initial vector.

If the end of the vector is within the circle to which the four values of the mark correspond, there is no problem in determining the associated mark and its value. However, if the perspective is so strong that the end of the vector is far from the associated raster point, the length and the angles for creating the next vector can be adjusted until acceptable values are obtained. Alternatively, the result of the decoding of the preceding image frame can be used as the starting point for a preparatory adjustment of the perspective before decoding takes place.

The invention can be combined in several different ways within the scope of the description above. All such combinations, which are apparent to a person skilled in the art who reads this description, are intended to be included within the scope of the invention. The invention is only limited by the appended claims.

What we claim and desire to secure by letters patent is:

1. A method for determining a virtual raster of a code pattern consisting of a plurality of marks with associated coordinates $m_n$, each mark being located at a nominal position but displaced from the nominal position in one of a plurality of directions, depending upon the value of the mark, in addition to which the nominal positions define raster points $g_n$ of the virtual raster, and the raster points are situated on raster lines which intersect at a first angle, comprising:
determining an initial vector $V_{1,2}$ on the basis of the coordinates $m_1$, $m_2$ of one or more marks, which initial vector extends approximately between a first and a second adjacent raster point $g_1$, $g_2$;
determining a second vector $V_{2,3}$ which forms said angle with the first vector and is the same length as the first vector and extends from the second raster point $g_2$ approximately to a third raster point $g_3$;
determining a mark coordinate $m_3$ which belongs to the third raster point $g_3$;
determining the actual coordinates for the third raster point on the basis of the third mark's coordinates and its value and the preceding raster point's coordinate; and
storing the third raster point's actual coordinates.

2. A method according to claim 1, wherein the initial vector is determined as the vector which connects the two marks which are at a distance which is the least of a set of marks, the vector being extended on each side by a distance corresponding to the displacement of the marks from the associated raster point.

3. A method according to claim 1, wherein the raster points form an essentially orthogonal square grid.

4. A method according to claim 3, wherein each mark is displaced along a raster line by a distance corresponding to between ⅛ and ¼, preferably ⅙, of the distance between two raster points.

5. A method according to claim 4, wherein the mark's coordinates are determined as the center of gravity of the whole mark.

6. A method according to claim 5, wherein the mark is obtained as an image on a sensor, which has a plurality of pixels, each mark taking up more than one pixel on the sensor surface.

7. A device for determining a virtual raster of a code pattern consisting of a plurality of marks with associated coordinates $m_n$, each mark being located at a nominal position but displaced from the nominal position in one of a plurality of directions, depending upon the value of the mark, in addition to which the nominal positions define raster points $g_n$ of the virtual raster, and the raster points are situated on raster lines which intersect at a first angle, comprising a device for determination of an initial vector $V_{1,2}$ on the basis of the coordinates $m_1$, $m_2$, of one or more marks, which initial vectors extend approximately between a first and a second adjacent raster point $g_1$, $g_2$;

a calculation device for the determining a second vector $V_{2,3}$ which forms said angle with the first vector and is the same length as the first vector and extends from the second raster point $g_2$ approximately to a third raster point $g_3$;

a calculation device for determining a mark coordinate $m_3$ which is associated with the third raster point $g_3$;

a calculation device for determining the actual coordinates of the third raster point on the basis of the third mark's coordinates and its value;

a storage device for storing the third raster point's actual coordinates; and a calculation device for calculating the subsequent vector by using. the second vector.

8. A device according to claim 7, wherein the initial vector consists of the vector which connects the two marks which are the least distance apart of a set of marks, the initial vector being extended on both sides by a distance corresponding to the displacement of the marks from the associated raster point.

9. A device according to claim 7, wherein the raster points form an essentially orthogonal square grid.

10. A device according to claim 9, wherein each mark is displaced along a raster line by a distance corresponding to between ⅛ and ¼, preferably ⅙, of the distance between two raster points.

11. A device according to claim 10, wherein the coordinates of the mark are determined as the center of gravity of the whole mark.

12. A device according to claim 11, wherein the marks constitute an image on a sensor, which has a plurality of pixels, each mark taking up more than one pixel on the sensor surface.

13. A computer-readable computer program product which comprises a computer program with instructions to cause the computer to implement a method according to any one of claims 1–6.

14. A method according to any one of claims 3–6, wherein the initial vector is determined as the vector which connects the two marks which are at a distance which is the least of a set of marks, the vector being extended on each side by a distance corresponding to the displacement of the marks from the associated raster point.

15. A device according to any one of claims 9–12, wherein the initial vector consists of the vector which connects the two marks which are the least distance apart of a set of marks, the initial vector being extended on both sides by a distance corresponding to the displacement of the marks from the associated raster point.

\* \* \* \* \*